United States Patent [19]
Lutz

[11] 3,904,022
[45] Sept. 9, 1975

[54] ARTICLE HANDLING SYSTEM

[76] Inventor: David E. Lutz, 330 Washington Ln., Carlisle, Pa. 17013

[22] Filed: July 24, 1973

[21] Appl. No.: 382,059

Related U.S. Application Data

[62] Division of Ser. No. 201,807, Nov. 24, 1971, Pat. No. 3,777,916.

[52] U.S. Cl. .................................. 198/85; 198/219
[51] Int. Cl. .......................................... B65g 37/00
[58] Field of Search .......... 198/219, 218, 107, 106, 198/78, 79, 85; 104/48; 214/16.1 CF, 16.1 A, 16.1 CD, 16.4 C, 16.1 B

[56] References Cited
UNITED STATES PATENTS

| | | | |
|---|---|---|---|
| 2,999,579 | 9/1961 | Kostrzewa | 198/19 |
| 3,011,621 | 12/1961 | Byrnes | 198/78 |
| 3,122,231 | 2/1964 | Pence et al. | 198/78 |
| 3,173,557 | 3/1965 | Eliassen | 198/78 |
| 3,420,358 | 1/1969 | Iversen | 198/219 |
| 3,451,532 | 6/1969 | Materfield | 198/219 |
| 3,722,865 | 3/1973 | Storck et al. | 198/219 |

*Primary Examiner*—Albert J. Makay
*Assistant Examiner*—Gary Auton
*Attorney, Agent, or Firm*—Edward E. Dyson; John J. Byrne

[57] ABSTRACT

An article handling system for vehicles for moving articles through an endless, generally rectangular path comprising a pair of spaced, parallel walking beam conveyors which intersect with a pair of tranversely extending conveyors at the respective ends of the walking beam conveyors.

6 Claims, 13 Drawing Figures

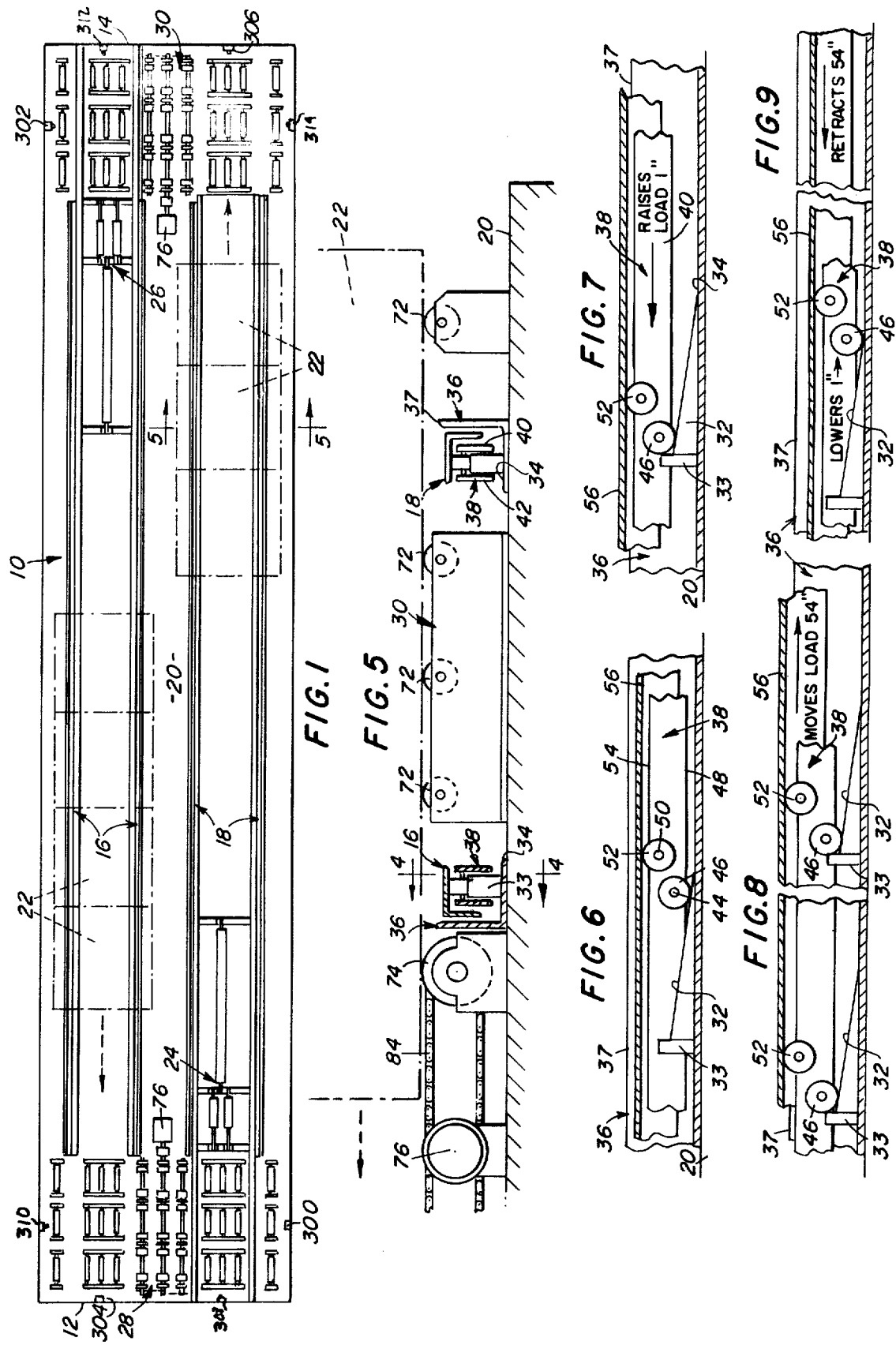

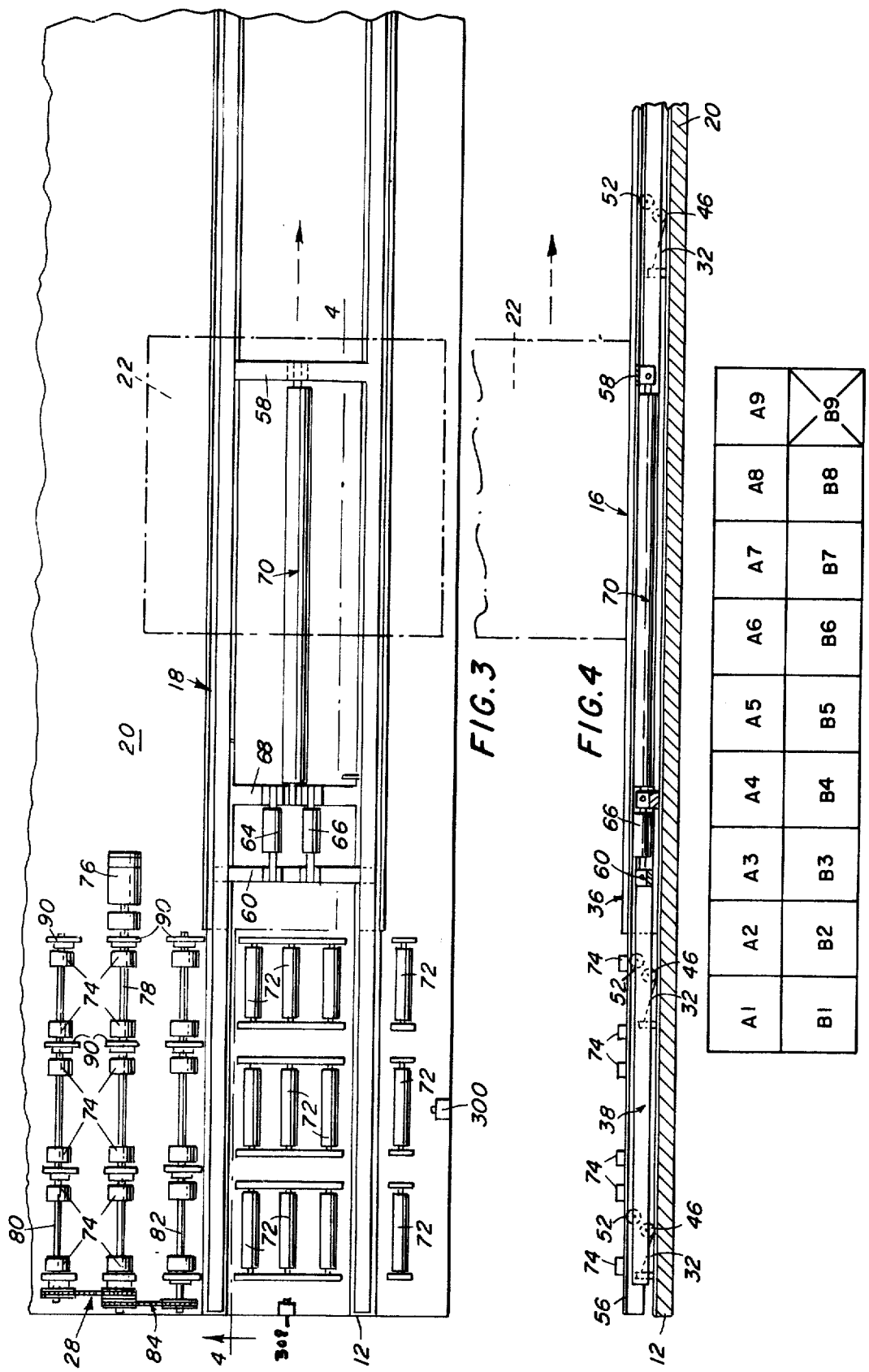

ARTICLE HANDLING SYSTEM

This application is a division of application Ser. No. 201,807, filed Nov. 24, 1971, now U.S. Pat. No. 3,777,916.

This invention relates to an article handling system, and more particularly to a system for shifting and orienting containers within a confined area such as within a vehicle body or the like.

The article handling system of this invention can be easily fitted to existing truck bodies or other confined areas and is particularly adapted for use with standardized containers. A primary purpose of the system of this invention is to permit access to a particular container regardless of its position relative to an access opening without having to remove other containers from the confined area. This invention is related to the invention described in my co-pending application Ser. No. 169,569 filed Jul. 20, 1971, entitled ARTICLE HANDLING SYSTEM.

For purposes of illustration, the article handling system of this invention will be described with reference to its installation in load-carrying vehicle bodies though it is to be understood that the system possesses utility in any confined area whether it be mobile or stationary.

The majority of the vehicle mounted conveyor systems of the prior art are used for direct loading or unloading only and not for selectively delivering a particular container to a particular position on the truck without having to remove other containers. It is known to use an endless conveyor on a truck body for select delivery by moving articles through a generally oval path; however, such systems are impractical from a cost standpoint in that entirely too much free space must be allowed for the containers on the conveyor to make the turns around the sharp corners of the truck body. Further, the mechanism of the conveyor itself has generally been of a rather bulky construction further reducing the space that is available for hauling cargo. The system of this invention permits the carrier to maximize the usage of the space within the truck body; and is particularly adapted for standardized containers having pallet bases compatible for use with fork-lift loaders. Standardized containers are desirable in that they facilitate the use of the optimum amount of space in a vehicle body and are more suitable for stacking. In some systems the container itself must be of a particular design and many times is required to be specially fitted with dollies or have other miscellaneous hardware attached thereto which is only useful when used with the particular mechanized system for which it was originally adapted.

The basic concept under which the mechanized system of this invention operates involves the sectioning of the truck body into a plurality of contiguous, generally square areas aligned in two longitudinal rows. Each of the squares receives a container with the exception of one which is left blank. By subjecting the two rows of containers to a plurality of sequenced rectilinear movements using the blank space, a particular container may be brought to a particular location on the floor of the truck body without having to remove any of the containers from the truck. A parallel pair of walking beam type conveyors are mounted on the truck floor and effect longitudinal movements of the two rows. The transverse movement, or the shifting of containers from one row to another at the corners is accomplished by drivenroll type conveyors positioned at each end of the walking beam conveyors. Walking beam conveyors for trucks are known in the prior art but are generally more complicated and consume more space than the walking beam conveyor of this invention. Further, truck mounted walking beams of the prior art are generally used for straight loading or unloading only, and not in combination with transverse conveyors to effect load movements in a rectangular path within the confines of a vehicle body under the concepts outlined earlier herein.

It is an objective of this invention to provide an article handling system particularly useful within confined areas such as within the load carrying section of a truck.

It is another objective of this invention to provide a mechanized article handling system of compact design and easily adaptable to existing truck bodies.

It is a further objective of this invention to employ an article handling system which, upon actuating suitable controls, will deliver a designated container to a particular area of the truck.

It is a further objective of this invention to provide a mechanized article handling system for trucks or the like wherein the mechanized system consumes virtually none of the interior volume of the truck body and shifts standardized containers or pallet loads in a plurality of rectilinear movements in such a manner that the maximum volume of the truck body may be utilized for the handling of income-producing freight.

It is another objective of this invention to provide a mechanized article handling system particularly adaptable for use with standardized containers, normal palletized loads, or freight placed on wooden sheets, but requiring no particular modifications to the containers in order to render them usable with the mechanized system.

It is a further objective of this invention to provide a mechanized article handling system which can be sold in component form and placed in an existing truck body without compromising the structural integrity of the body.

It is another object of this invention to provide a vehicle and walking beam conveyor combination of a simple and more durable construction than that known to the prior art.

These and other objects of the invention will become more apparent to those skilled in the art by reference to the following detailed description when viewed in light of the accompanying drawings wherein:

FIG. 1 is a plan view of the article handling system of this invention installed in the floor of a truck body and more particularly the floor of a tractor-drawn trailer or semi-trailer;

FIG. 2 is a diagrammatic illustration of the arrangement of containers on a vehicle employing the article handling system of this invention;

FIG. 3 is a fragmentary plan view of the drive means for one of the longitudinal or walking beam conveyors;

FIG. 4 is a view taken on line 4—4 of FIG. 3;

FIG. 5 is a view taken on lines 5—5 of FIG. 1;

FIGS. 6 through 9 illustrate the sequence of movements of the components of the walking beam conveyor to index a load one position;

Figure 10:
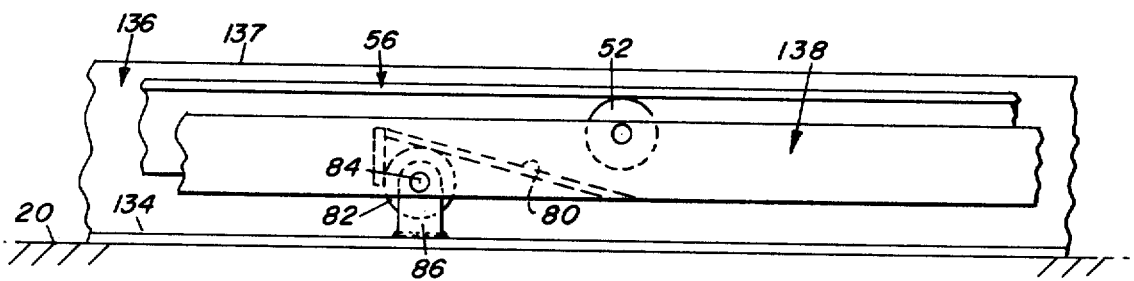
FIG. 10 is an elevational view of another embodiment of the longitudinal or walking beam conveyor of this invention.

As mentioned earlier herein the article handling system of this invention will be described with respect to its installation on a vehicle truck body; however, it is to be understood that it has utility other than confined areas, whether movable or stationary. Further, the article handling system of this invention can be used for direct loading or unloading of vehicles or the like in addition to being useful in selective delivery of the type set forth in my earlier copending application.

The concept upon which this application is based can be best understood by reference to FIGS. 1 and 2 wherein 10 generally indicates an enclosed truck body, in this case a tractor-drawn trailer. For purpose of illustration, the end 12 will be referred to as the rear end, and the end 14 will be referred to as the front end. A pair of identical longitudinally extending walking beam conveyors 16 and 18 extend lengthwise of the floor 20 of the trailer in parallel spaced relationship. In this particular case, the walking beam conveyors are arranged to generally underlie two rows, respectively, of standardized containers 22. As shown in the drawing, the walking beam conveyors 16 and 18 are oriented such that the power units 24 and 26 are at opposite ends, though, as will be pointed out later, the walking beam conveyors are capable of moving the containers spaced thereon either frontwardly or rearwardly thereby rendering the placement of the power sections a matter of choice. Transverse conveyors 28 and 30 extend across the rear and front ends respectively of the trailer floor and span the distance between the two longitudinally extending walking beam conveyors 16 and 18. The transverse conveyors are of the power-roll type and will be explained in greater detail below. Though the system is not limited to a particular type of container or pallet, it is best to use standardized containers or pallets of a size designed to maximize usage of space within the confines of a vehicle body. Examples of such containers are those disclosed in copending applications Ser. No. 114,257 filed Feb. 10, 1971 entitled CONTAINER and Ser. No. 141,199 filed May 7, 1971, entitled MOBILE CARGO STORAGE UNIT. The vehicle floor is sectioned into imaginary squares aligned in two rows, A1-A9 and B1-B9, respectively as shown in FIG. 2. Each of the squares is occupied by a container with the exception of one, in this case square B9 which is left vacant. It is this vacant area which permits the containers to be shifted in transverse and rectilinear movements, as will hereinafter be more fully described. The containers can be stacked to more fully maximize the space of the trailer body.

The indexing of the containers one square or one container length will now be described with particular reference to FIG. 2. Since the blank space B9 is to the top of the transverse conveyor 30, as seen in the drawing, that conveyor will be actuated first to move the container occupying the square A9 to the square B9. In step 2, the longitudinal conveyor or walking beam conveyor 18 is actuated to move the entire row of containers occupying positions A1 through A8 to position A2 through A9. After step 2, station A1 will be vacant, whereupon the transverse conveyor 28 is actuated in step 3 to move the container in the space B1 to space A1. In step 4, the longitudinal conveyor 16 is actuated to move the containers in stations B2 through B9 to stations B1 through B8. This sequence is defined as indexing one position or one square. One complete circuit is defined as indexing until the original arrangement is regained. For a seventeen container load, one circuit (original container returned to starting position) requires seventeen indexing sequences of four steps each. Thus, it can be seen that by performing a certain number of index sequences, a particular container, for example, the one occupying the position in station A9 at the front end of the trailer, can be delivered to the position B1 at the rear end of the trailer where it can be conveniently removed by fork lift truck or the like without having to remove any other containers from the trailer. It is also to be noted that this system permits the utilization of a maximum amount of space within the truck body. This is contrary to endless conveyor or track systems of the prior art wherein a large amount of wasted space had to be allowed at each of the corners of the trailer to permit the containers to make the turn. It is to be understood that the longitudinal and transverse conveyor means of this invention can move the container in the reverse direction; that is, assuming position B9 to be vacant, containers in positions B1 through B8 can be shifted to positions B2 through B9 as the first step in that particular index sequence, and so on.

It is to be understood that just the longitudinal conveyor means may be employed without the transverse conveyors for straight loading and unloading, in which event the power units 24 and 26 may be placed at the same end.

The longitudinal conveyor means will now be described; it being understood that units 16 and 18 are identical and only one, conveyor 18, will be referred to specifically. The longitudinal conveyor 18 is of the walking-beam type and comprises a pair of longitudinally extending portable stationary beams 36 having base legs 34. Ramps 32 are affixed to the base legs 34 in tandemly arranged pairs and each includes a roller step 33. The stationary beams 36 are affixed to floor 20 by any suitable means. A pair of longitudinally extending intermediate beams 38 overlie the base portions 34 of the beams 36 and are comprised of side plates 40 and 42 joined together in spaced relationship by the roller and axle assemblies to be described below. The intermediate beams 38 are joined by suitable transversely connecting members 60. A first set of axles 44 are journaled in the side plates 40 and 42 at longitudinally spaced positions generally corresponding to the location of the ramps 32. First or lower rollers 46 are journaled on each of the axles 44 and have peripheries which contact the surface of the ramps 32. The peripheries of the rollers may extend below the edges 48 as shown. A second set of axles 50 are journaled in the side plates 40 and 42 and generally lie in a plane above that of the first set of axles, and have rollers 52 with peripheries lying above the edges 54 of the plates 40 and 42 so that they contact the movable beams 56. Movable beams 56 joined by suitable transverse connecting members 58 are supported by the rollers 52 on the intermediate beams 38.

Piston-cylinder assemblies 64 and 66 comprise the drive means for reciprocating the intermediate beams 38, and are attached at one end to stationary transverse member 68, which is affixed to the floor and to the stationary beams 36, and at the other end the cylinder assemblies 64, 66 are attached to transverse member 60 which connects the intermediate beams 38. Hydraulic cylinder assembly 70 comprises the drive means for reciprocating the movable beams, and is affixed at one end to the stationary transverse member 68 and at the other end to transverse member 58 which connects the movable beams. In a preferred embodiment, the stroke length of cylinders 64 and 66 generally corresponds to the length of the ramps which is approximately 6 inches, with a 1 inch elevation. The stroke length of the cylinder 70 is the length of a standarized container, which in a preferred embodiment is approximately 54 inches.

When the cylinders 64 and 66 are in the retracted position, the intermediate beams 38 are in the down position such that the movable beams 56 supported thereon are below the upper edges 37 of the stationary beams 36 as shown in FIG. 5. In this position, the containers will rest on the edges 37, with the exception that when a container is in one of the corner positions, it will rest on the rollers 72 as best seen in FIG. 5. The upper peripheries of the rollers lie above the edges 37 of the fixed beams, but below the upper surfaces of the movable beams when the movable beams are in the fully raised position. When the intermediate beams 38 are pulled up the ramps 32 by extending the cylinders 64 and 66, the movable beams 56 will be raised above the upper edges 37 of the stationary beams 36, thereby lifting the containers off of the edges 38. The movable beam 56 is then shifted by the hydraulic cylinder 70 of the power unit 24 or 26 to move the containers supported therein one container length, after which the cylinders 64 and 66 are contracted thereby lowering the intermediate beams and movable beams 56 to again place the load on the upper edges 37 of the stationary beams 36. The movable beam is then retracted back to its original position by retracting the cylinder 70. To move the containers in the reverse direction the movable beams 56 are first extended, the intermediate beams are raised on ramps 32, and the beams 56, now supporting the load, are retracted.

The transverse conveyor mechanisms 28 and 30 each comprises sets of idle rolls 72 generally aligned with each end of each of the longitudinal conveyors 16 and 18, the rollers being journaled on axles which extend in a direction parallel to the direction of the longitudinal conveyors. The sets of idle rolls are spaced by a set of driven rolls 74, which are driven by a conventional electrical or hydraulic reversible rotary motor 76 which drives a central shaft 78 and laterally spaced shafts 80 and 82 by means of a sprocket and chain drive generally indicated by the numeral 84. The driven rolls 74 are covered by a suitable gripping surface for frictionally engaging the underside of a container set thereon to shift it from one longitudinal conveyor to the other in the proper sequence. It is to be understood that when the movable beams lower the containers onto the rollers of the transverse conveyor, the container will rest partially on the rolls 72 and partially on rolls 74. The shafts 78, 80, and 82 are journaled in brackets 90 which are affixed to the floor 20.

Limit switches 300-314 can be employed to emergize the operation of the longitudinal and transverse conveyors in the proper sequence during indexing of the containers. Switches 300, 302, 304 and 306 are energized for actuation of the containers in the counterclockwise direction, and switches 308-314 are energized during clockwise movement.

It is readily apparent that the conveyors 16, 18, 28 and 30 comprising the total article handling system of this invention can be readily adapted to existing truck bodies by simply attaching the stationary beams 36 and the brackets journaling the rollers of the roller conveyors to the floor 20 by conventional fastener means. The various units can be marketed in kits for assembly by the purchaser and require no particular expertise for assembly or operation.

A modified form of the longitudinal walking beam conveyor is shown in FIG. 10. Instead of attaching the ramp to the floor of the vehicle, the ramps are made integral with the intermediate beams, and the rollers are attached to the floor. Referring to the figure, the intermediate beams 38 are provided with upper rollers 52 for supporting movable beams 56 as in the first embodiment. Plates 80 are joined to side plates 40 and 42 and are inclined at approximately the same angle as the ramps 32 in the first embodiment and are of approximately the same length. Rollers 82 are rotatably mounted on axles 84 journaled in brackets 86. The brackets 86 are in turn fixedly attached to the base 34 of the fixed beams 36. The beams 36, of course, are affixed to the floor of the vehicle. In operation, the cylinders 64 and 66 are extended to reciprocate beams 38 such that the undersides of plates 80 ride up on rollers 82 to raise the beams 38 and therefore, beams 56, the latter being raised above the edges 37 of stationary beams 36.

Figure 11:
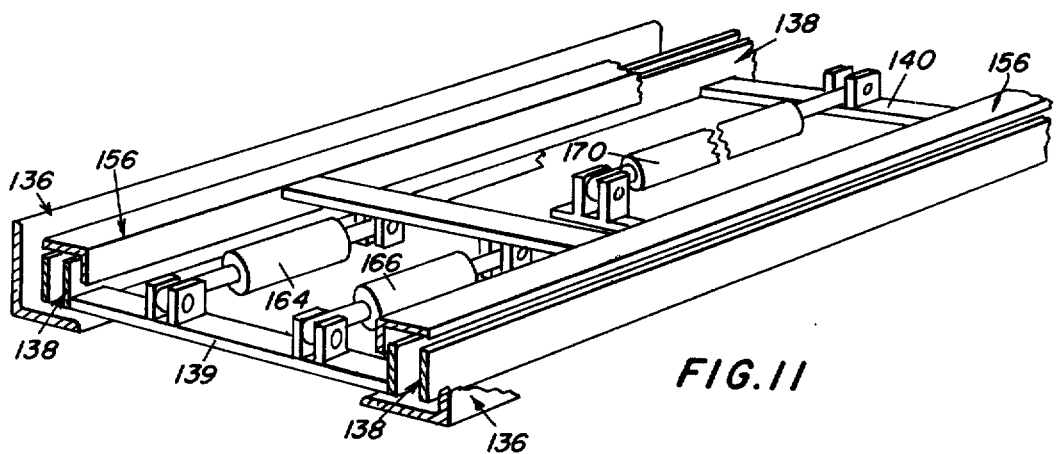
FIG. 11 is a further perspective view of another embodiment of the longitudinal or walking beam conveyor of this invention.
Figure 12:
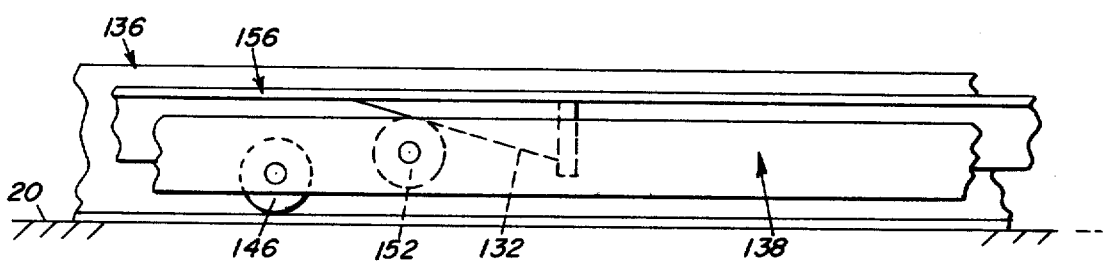
FIG. 12 is a side view in elevation of the walking beam conveyor of FIG. 11.

A further modified form of the invention is shown in FIG. 11 and 12, wherein ramps 132 are affixed in an inverted manner to movable beams 156, and stationary beams 136 are affixed to the floor of the vehicle. The intermediate beams 138 are provided with the first rollers 146 which ride on the floor or on the base legs of the stationary beams 136, and second rollers 152 which are engaged by ramps 132. Cylinders 164 and 166 are each attached at one end to the intermediate beams 138 at cross member 139, and at the other end to the movable beams 156 such that, when extended, the movable beams will be raised vertically upwardly by means of the engagement of the ramps 132 with the rollers 152. The cylinder 170 is attached at one end to the floor and at the other end to the intermediate beams 138 by means of the cross member 140, such that when cylinder 170 is extended both beams 156 and 138 are shifted together relative to the fixed beam 136.

Figure 13:
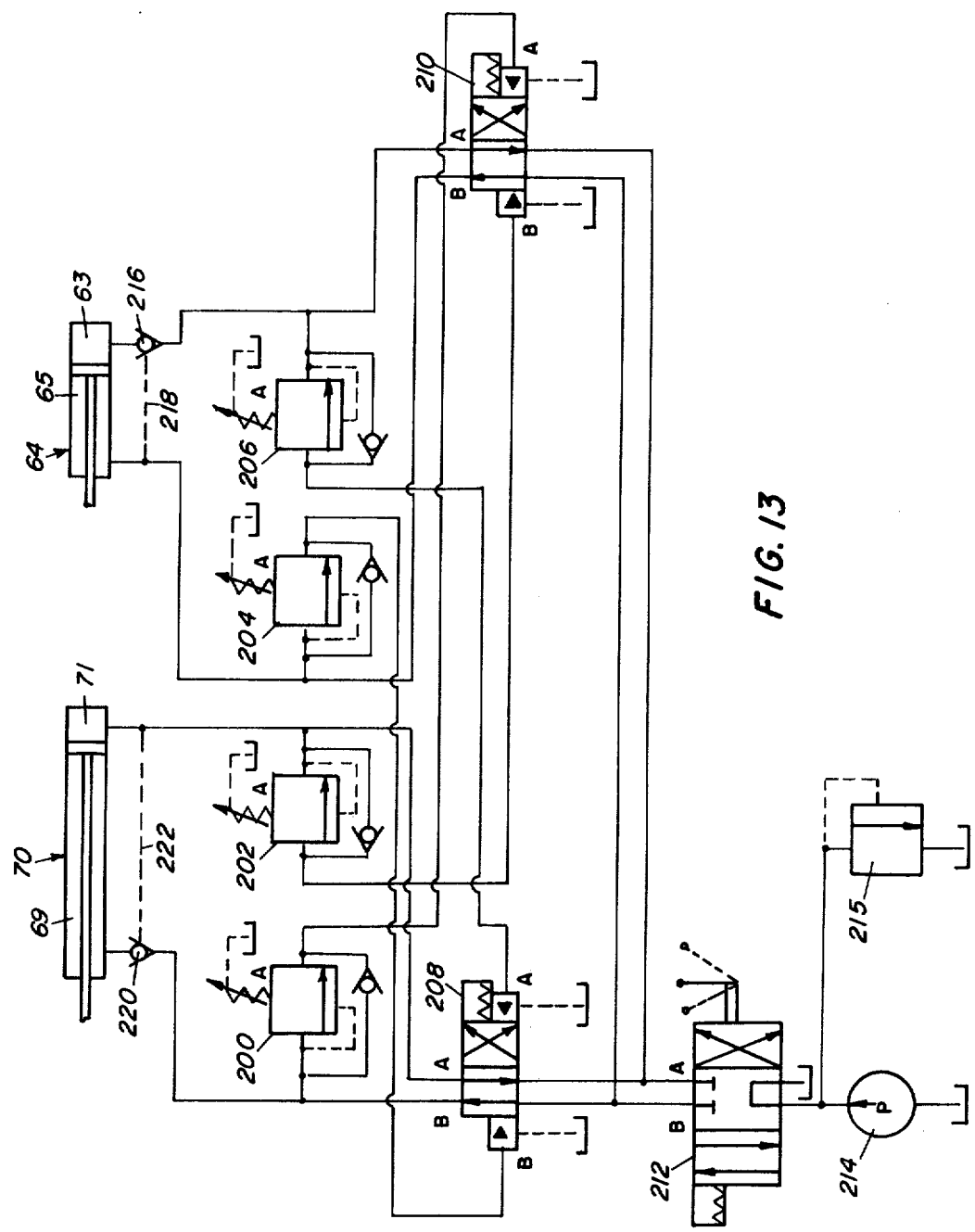
FIG. 13 is a diagrammatic illustration of the hydraulic system of this invention.

The hydraulic system employed to actuate the cylinders in proper sequence is diagrammatically illustrated in FIG. 13. Only one of the cylinders used to vertically raise the conveyor, cylinder 64 is shown. It is to be understood that cylinder 66 is connected in parallel with cylinder 64 and will be accuated in unison therewith. In addition to the cylinders 64 and 70, the system includes four sequencing valves 200, 202, 204 and 206 designed to open upon sensing a pre-determined pressure, two pilot-operated four-way valves 208 and 210, a main control valve 212, which is a manually operated four-way open center valve and a pump 214 capable of working pressures to 1,500 p.s.i. and instantaneous peak pressures to 2,500 p.s.i.

In the normal loading functions, cylinder 64 is first actuated to raise the movable beams above the fixed beams after which the cylinder 70 is actuated to shift the movable beam one position or one container length. To accomplish this, valve 212 is shifted to the load position and valves 208 and 210 are in the B and A positions, respectively. The latter two valves are dented in one of their two positions until shifted by fluid pressure. Fluid pressure from pump 214 is introduced into chamber 63 of cylinder 64 causing the cylinder to extend. The fluid under pressure will also be transmitted to chamber 69 of cylinder 70, thereby maintaining cylinder 70 in the retracted position. Cylinder 64 will move outwardly to its limit whereupon the pressure build-up in chamber 63 will be sensed by sequencing valve 206, causing the valve to open when the pressure reaches a predetermined level. The pilot operated check valve 216 will hold the cylinder 64 in its extended position until forced off its seat by a sensed pressure in line 218 as will be described hereinafter. The opening of sequencing valve 206 transmits pressure to pilot operated four way valve 208 to shift it into the A position, wherein fluid under pressure is transmitted to chamber 71 of cylinder 70 causing the cylinder to extend to its full limit. The pilot operated check valve 220 will be unseated by pressures in line 222 permitting chamber 69 to exhaust. As mentioned earlier, the cylinder 70 shifts the movable beams of the walking beam conveyor one position or one container length. When the piston in cylinder 70 is extended to its limit, the pressure build-up will be sensed by sequencing valve 202 causing the latter to open to transmit fluid pressure to pilot operated four-way valve 210 to shift the latter to the B position. Pressure will be transmitted to chamber 65 of cylinder 64 and also to pilot operated check valve 216 causing the valve to open and permitting the piston in the cylinder 64 to retract. Once the cylinder 64 is fully retracted, the pressure build-up in chamber 65 will be sensed by sequencing valve 204 whereby the latter will open to transmit pressure to pilot operated four-way valve 208 to move the valve back to the B position, whereupon fluid under pressure is introduced into chamber 69 of cylinder 70 causing the cylinder to retract. When the cylinder is fully retracted, the pressure build-up in chamber 69 will be sensed by sequencing valve 200 which will open to permit fluid under pressure to shift pilot operated four-way valve 210 back to the A position. The system is now ready to begin a new cycle and will automatically repeat the cycle as long as the manual four-way open center valve 212 is left in the load position. Of course the system will stop and fluid simply pumped to the tank if the valve 212 is shifted to the center position. To reverse the movement of the conveyor, or in other words, to actuate the cylinder 70 prior to the actuation of the lift cylinder 64, the valve 212 is shifted to the unload position. The operation is substantially identical with the exception of the reversal of steps in the cycle. A relief valve 215 is set at a predetermined pressure level which will protect the pump but still permit the actuation of the pressure operated sequence valves.

The pilot operated check valve 216 is employed to prevent the cylinder 64 from retracting under the force of gravity when the intermediate beams 38 are in a raised position on the ramps 32. In a preferred embodiment, the force required to open the check valves is less than 100 p.s.i. The forces tending to extend the cylinder 64 when in the retracted position will be minimal, therefore no check valve is required for the chamber 65. The same applies to chamber 71 of cylinder 70. However, a check valve is required for chamber 69 and is actuated at about 200 p.s.i. This check valve prevents the cylinder 70 from extending in the reverse cycle during the step of lowering the intermediate and movable beams while the cylinder 70 is in the retracted position.

In general manner, while there has been disclosed effective and efficient embodiment of the invention, it should be well understood that the invention is not limited to such embodiment as there might be changes made in the arrangement, disposition, and form of the parts without departing from the principle of the present invention as comprehended within the scope of the accompanying claims.

I claim:

1. A conveyor system particularly adapted for moving uniform load units in an endless substantially rectangular path on a floor, said load units being arranged in aligned parallel rows on said floor with at least a single void area at least approximately the size of the area covered by a single load unit in at least one of said rows, said conveyor system comprising a pair of adjacent elongated walking beam conveyors underlying said rows, first and second drive means for actuating each of said walking beam conveyors to shift said units in said rows in longitudinal directions, a pair of transverse conveyor units at opposite ends of said rows and extending between adjacent ends of said walking beam conveyors, third and fourth drive means for actuating said pair of transverse conveyors to shift a load unit from one walking beam conveyor to the other, and control means for actuating said drive means in a predetermined sequence utilizing said void area to shift said units intermittently in said continuous generally rectangular path over said floor.

2. An article handling system as defined in claim 1 wherein each of said walking beam conveyors comprises a plurality of stationary elongated beams supported on said floor, a plurality of movable elongated beams interspaced with and generally parallel to said stationary beams, ramp means on said floor and generally underlying said movable beams, said ramp means being inclined in the direction of elongation of said movable beams, a plurality of intermediate elongated beams vertically interposed between said movable beams and said ramp means, first roller means journalled to said intermediate beams for rolling engagement with said ramp means, second roller means on said intermediate beams for supporting said movable beams for relative reciprocatory movement, said first and second drive means each including means for reciprocating said intermediate beams up said ramp means whereby said movable beams are moved generally vertically from a position wherein the upper surfaces of said movable beams are below those of said fixed beams to a position wherein said upper surfaces of said movable beams are above those of said fixed beams, said first and second drive means each further including means for reciprocating said movable beams in one direction on said second roller means when the upper surfaces of the movable beams are above those of the fixed beams and for returning the movable beams when the upper surfaces thereof are below those of the fixed beams.

3. An article handling system as defined in claim 2 wherein said transverse conveyors are power roll conveyors.

4. An article handling system as defined in claim 2 wherein said first and second drive means are hydraulic piston and cylinder assemblies.

5. An article handling system as defined in claim 1 wherein each of said walking beam conveyors comprises a plurality of stationary elongated beams affixed to said floor, a plurality of movable elongated beams interspaced with and generally parallel to said stationary beams, first roller means affixed to said floor and generally underlying said movable beams, a plurality of intermediate elongated beams vertically interposed between said movable beams and said first roller means, ramp means on said intermediate beams for rolling engagement with said first roller means, second roller means on said intermediate beams for supporting said movable beams for relative reciprocatory movement, said first and second drive means comprising means for reciprocating said intermediate beams and said ramp means on said first roller means whereby said movable beams are moved generally vertically from a position wherein the upper surfaces of said movable beams are below of said stationary beams to a position wherein said upper surfaces of said movable beams are above those of said fixed beams, and said first and second drive means further including means for reciprocating said movable beams in one direction on said second roller means when the upper surfaces of the movable beams are above those of the stationy beams, and for returning the movable beams when the upper surfaces thereof are below those of the stationary beams.

6. The article handling system of claim 1 wherein each of said walking beam conveyors comprises a plurality of stationary elongated beams affixed to said base support, a plurality of movable elongated beams interspaced with and generally parallel to said stationary beams, a plurality of intermediate elongated beams vertically interposed between said movable beams, first roller means journaled to said intermediate beams for rolling engagement with said base support, second roller means on said intermediate beams, ramp means on the underside of said movable beams for movement over said second roller means, said first and second drive means comprising means for reciprocating said movable beams and said ramp means over said second roller means whereby said movable beams are moved generally vertically from a position wherein the upper surfaces of said movable beams are below those of said fixed beams to a position wherein said upper surfaces of said movable beams are above those of said second beams, and said first and second drive means further including means for reciprocating said movable beams in one direction on said second roller means when the upper surfaces of the movable beams are above those of the fixed beams, and returning the movable beams when the upper surfaces thereof are below those of the fixed beams.

* * * * *